US012613157B1

(12) United States Patent
    Bi

(10) Patent No.: US 12,613,157 B1
(45) Date of Patent: Apr. 28, 2026

(54) INFLATABLE WATER SPORTS APPARATUS WITH ELECTRONIC BAROMETER DEVICE

(71) Applicant: YOUNGER TIME PTE. LTD., Singapore (SG)

(72) Inventor: Wentao Bi, Rongcheng (CN)

(73) Assignee: YOUNGER TIME PTE. LTD., Singapore (SG)

( * ) Notice: Subject to any disclaimer, the term of this patent is extended or adjusted under 35 U.S.C. 154(b) by 0 days.

(21) Appl. No.: 19/289,090

(22) Filed: Aug. 3, 2025

(30) Foreign Application Priority Data

Feb. 14, 2025    (CN) .......................... 202510167617.0
Jul. 17, 2025    (CN) .......................... 202510991642.0

(51) Int. Cl.
    *B63B 1/00*      (2006.01)
    *B63C 9/00*      (2006.01)
    *G01L 19/14*     (2006.01)

(52) U.S. Cl.
    CPC .............. *G01L 19/143* (2013.01); *B63B 1/00* (2013.01); *B63C 9/00* (2013.01)

(58) Field of Classification Search
    CPC ........... B63B 1/00; B63B 32/10; B63B 32/70; B63C 9/00; B63C 9/01; B63C 9/15; G01L 19/143
    USPC ............................................... 441/65, 66, 74
    See application file for complete search history.

(56) References Cited

U.S. PATENT DOCUMENTS 7,662,006 B2 *   2/2010   Mollis ..................... B63B 32/51
                                                          441/74

FOREIGN PATENT DOCUMENTS

EP            4435552 A1 *   9/2024   ......... G05D 16/2066

* cited by examiner

*Primary Examiner* — Lars A Olson
(74) *Attorney, Agent, or Firm* — Che-Yang Chen

(57)            ABSTRACT

An inflatable water sports apparatus includes an inflatable body having an inflation chamber and an electric barometer device installed on the inflatable body to monitor an air pressure in the inflation chamber during use of the inflatable water sports apparatus. This enables early warnings of air leakage or pressure fluctuations, helping to prevent safety hazards caused by sudden deflation or over-pressurization.

22 Claims, 25 Drawing Sheets

A

B

INFLATABLE WATER SPORTS APPARATUS WITH ELECTRONIC BAROMETER DEVICE

CROSS REFERENCE OF RELATED APPLICATION

This application is a non-provisional application that claims priority under 35 U.S.C. § 119 to China application number CN202510167617.0, filing date Feb. 14, 2025, and China application number CN202510991642.0, filing date Jul. 17, 2025, wherein the entire content of which is expressly incorporated herein by reference.

BACKGROUND OF THE PRESENT INVENTION

Field of Invention

The present invention relates to an inflatable product, and more particularly to an inflatable water sports apparatus with electronic barometer device.

Description of Related Arts

Currently, inflatable water sports products do not have a pressure gauge or a built-in mechanical pressure gauge. For inflatable water sports products without a pressure gauge, the air pressure of the inflatable water sports products can only be detected by relying on the pressure gauge of the inflating equipment during the inflation process. During the use process after inflation, the air pressure status cannot be detected and checked.

For inflatable water sports products with built-in mechanical pressure gauges, due to the structural principle of the mechanical pressure gauge, it is very easy to be damaged by severe vibration, resulting in inaccurate measurement or undetectable results. During the use and transportation of inflatable water sports products, severe vibration or impact will inevitably occur, so failures are frequent.

SUMMARY OF THE PRESENT INVENTION

The invention is advantageous in that it provides an inflatable water sports apparatus with an electronic barometer device. By securely mounting the electronic barometer device on the inflatable body and connecting the electronic barometer device to an air chamber, the internal air pressure can be monitored. This enables early warnings of air leakage or pressure fluctuations, helping to prevent safety hazards caused by sudden deflation or over-pressurization. Furthermore, the apparatus is designed to resist vibration and impact during normal use and transportation, reducing the risk of undetected damage to the pressure monitoring system Another advantage of the present invention is to provide an inflatable water sports apparatus with an electronic barometer device which functions as a device for air pressure monitoring. By continuously detecting the internal pressure, the electronic barometer device helps prevent a range of accidents that may result from excessive air pressure, such as those caused by thermal expansion during hot summer condition, or from insufficient pressure due to accidental damage or air leakage. The User can monitor pressure changes at any time, thereby enhancing both their safety and overall enjoyment during recreational activities.

Another advantage of the present invention is to provide an inflatable water sports apparatus with an electronic barometer device, wherein the electronic barometer device is suitable for various inflatable products, including but not limited to inflatable paddle board, inflatable speedboat, Kayak, inflatable pontoon, inflatable seat, inflatable tent, inflatable dog ladder, inflatable floating platform, and inflatable bed.

Another advantage of the present invention is to provide an inflatable water sports apparatus with an electronic barometer device, wherein the electronic barometer device is detachable, and the user can replace damaged accessory by himself or herself, which is convenient for use.

Additional advantages and features of the invention will become apparent from the description which follows, and may be realized by means of the instrumentalities and combinations particularly pointing out in the appended claims.

The present invention provides an inflatable water sports apparatus, which can be implemented as an inflatable paddle board, an inflatable speedboat, inflatable kayak, an inflatable pontoon, an inflatable seat, an inflatable tent, an inflatable dog ladder, an inflatable floating platform, or an inflatable bed.

The inflatable water sports apparatus comprises an inflatable body and an electronic barometer device, wherein the electronic barometer device is installed on the inflatable body and communicated to an air chamber, so as to detect the air pressure in the inflatable body in real time. In a specific embodiment of the present invention, the inflatable body is a paddle board body.

The electronic barometer device comprises an electronic barometer arrangement and a base, the electronic barometer arrangement can be disassembled from the base, and the installation method can be a knob thread installation.

The electronic barometer arrangement comprises a housing, a controller, a barometer and a battery. The housing is provided with threads at a bottom thereof for coupling with the base. The base is provided with threads which can be engaged with the threads of the housing of the electronic barometer. The base is buried in the inflatable body, and a display screen of the electronic barometer is exposed to the outside of the inflatable body. The housing of the electronic barometer can be further fixed to the inflatable body by punching holes and tightening, so that the air chamber of the entire inflatable body is sealed. The electronic barometer is basically inside the inflatable body as a whole, and its display screen can be slightly higher than the plane of the paddle board, which is convenient and practical to operate. At the same time, it prevents the electronic barometer from being hit and causing the connection to break, thereby increasing the service life of the product and reducing the chance of damage.

The barometer has a built-in battery, and the user can remove and replace the battery after the battery is exhausted, but the method is not limited to battery replacement. There is a Type-C interface on the outside, which can be charged for supplementary lighting, and it is waterproof. In addition, it can also be equipped with a solar panel to charge the battery through light.

The controller comprises a control circuit board and a switch. The switch can be a mechanical button or a touch button such as a capacitive touch button.

The working principle of the electronic barometer is based on the interaction between the air pressure sensor and the electric circuit system. It mainly senses the changes in gas pressure and converts them into electrical signals for display.

The core component inside a digital barometer is the air pressure sensor. This sensor is usually a piezoelectric element or a strain gauge that senses the pressure of a gas (such as the air in an inflatable paddle board). When the pressure of the gas changes, the sensor will produce a small physical change (such as deformation or change in charge).

The piezoelectric element is based on the piezoelectric effect, the sensor will generate an electric charge when it is subjected to pressure changes, and the size of the charge is proportional to the pressure.

The strain gauge is based on the strain principle, the resistance in the sensor changes with the external pressure, and the pressure is inferred by measuring the change in resistance.

The electrical signals generated by the pressure sensor (usually very weak voltage or current signals) need to be processed by the electronic circuit. The controller in the electronic barometer (usually including a microprocessor or operational amplifier) amplifies and converts these signals to make them easier to read.

The output signal of the sensor needs to be amplified by an amplifier circuit so that the system can detect smaller changes.

The amplified signal can be transmitted to the controller, and the corresponding air pressure value is calculated through built-in software or hardware.

After signal processing, the controller displays the calculated air pressure value to the user through the display screen. The display mode at this time can be digital (such as an LCD screen, showing digital air pressure value) or graphical (such as a pressure pointer dial, showing the pressure range).

The controller converts the air pressure value into a standard numerical value (for example, in PSI, Pa, or Bar) and then displays it digitally on the display.

Since the inflation pressure may change over time, the electronic barometer will update the displayed air pressure value in real time to ensure that users can always see the current air pressure status.

There are also 3 modes set for electronic control.

1. Long press to turn on the power, the display will be last for 600 seconds, and the test will be carried out at 590 seconds. If there is no pressure change within 10 seconds, it will flash three times and then turn off. If the pressure changes, test again after seconds. If there is no pressure change for ten seconds, it will flash three times and then turn off the display. If it reaches 15 psi during this period, it will flash three times and then turn off the display.
2. Click once to display the reading. After lighting up for five seconds, it flashes twice and then turns off automatically.
3. Monitor the changes in air pressure. If the air pressure is less than 12 psi, the alarm mode is triggered and the display starts flashing. It stops flashing when the device is turned off or the air pressure is inflated to more than 12 psi.

According to another aspect, the present invention provides an inflatable water sports apparatus, comprising:

an inflatable body having an inflation chamber; and an electric barometer device installed on the inflatable body to detect an air pressure in the inflation chamber.

According to an embodiment, the electric barometer device comprises an electric barometer arrangement which comprises a housing, a controller disposed in the housing, a barometer electrically connected to the controller and communicated to the inflation chamber for detecting the air pressure in the inflation chamber, a battery electrically connected to the controller.

According to an embodiment, the electric barometer device further comprises a base disposed in the inflation chamber, wherein the electric barometer arrangement is mounted on the base.

According to an embodiment, the housing comprises an engaging tube portion and a top cover portion connected to the engaging tube portion, wherein the top cover portion is mounted at an outer side of the inflation chamber, wherein the engaging tube portion has an inner passage, the base has an inner channel communicated between the inner passage of the engaging tube portion and the inflation chamber, wherein the barometer is communicated to the inner passage.

According to an embodiment, the base comprises a tube body and a circumferential biasing portion connected to the tube body, the tube body has the inner channel, the electronic barometer arrangement is detachably coupled with the tube body by threads.

According to an embodiment, wherein the engaging tube portion comprises external threads, the tube body comprises internal threads extended into the inner channel, wherein the internal threads of the tube body of the base are mated and engaged with the external threads of the engaging tube portion of the housing, so as to detachably couple the electronic barometer arrangement with the base.

According to an embodiment, one of the two body layers is retained between the circumferential biasing portion of the base and the top cover portion of the housing of the electronic barometer arrangement.

According to an embodiment, the controller comprises a control circuit board, the barometer is mounted on the control circuit board, wherein the electronic barometer arrangement further comprises a sealing tube attached to the control circuit board and disposed in the inner passage, wherein the sealing tube has a channel for housing the barometer, wherein the channel is communicated to the inner channel of the base.

According to an embodiment, the housing further comprises a bottom cover portion connected to the engaging tube portion, wherein the bottom cover portion has at least one communicating hole communicating the channel of the sealing tube to the inner channel of the base.

According to an embodiment, the bottom cover portion comprises a bottom end wall, a circumferential wall extended from the bottom end wall to define an inner chamber having a top opening for communicating with the inner passage, and a ring wall extended from the bottom end wall into the inner passage, wherein a shelter groove is formed in the ring wall, wherein the sealing tube comprises a bottom end portion which is disposed in the shelter groove at an inner side of the ring wall, the bottom end portion of the sealing tube is further formed with an installation groove which is disposed with a sealing ring.

According to an embodiment, outer threads are formed at an outer side of the circumferential wall of the bottom cover portion, the engaging tube portion comprises inner threads extended into the inner passage, so as to be mated and engaged with the outer threads of the bottom cover portion, so as to detachably couple the engaging tube portion with the bottom cover portion to form the inner passage.

According to an embodiment, the housing further comprises an upper annular sealing member wound around an upper portion of the circumferential wall and a lower annular sealing member wound around a lower portion of the circumferential wall, wherein the bottom cover portion is installed with the engaging tube portion, the upper annular sealing member is engaged with the inner threads of the engaging tube portion and is retained between the circumferential wall of the bottom cover portion and the engaging tube portion, when the electronic barometer arrangement is mounted to the base, the lower annular sealing member is engaged with the internal threads of the tube body and is retained between the circumferential wall of the bottom cover portion and the tube body.

According to an embodiment, the two body layers comprises a top body layer, wherein the top body layer has an installation opening, wherein the top body layer is retained between the circumferential biasing portion of the base and the top cover portion of the housing of the electronic barometer arrangement, wherein the engaging tube portion of the housing is extended into the inflation chamber through the installation opening.

According to an embodiment, the top cover portion of the housing of the electronic barometer arrangement comprises a bottom biasing surface, the circumferential biasing portion of the base comprises a top biasing surface, wherein the top body layer is retained between the bottom biasing surface of the top cover portion of the housing and the top biasing surface of the circumferential biasing portion of the base.

According to an embodiment, each of the bottom biasing surface of the top cover portion of the housing and the top biasing surface of the circumferential biasing portion of the base is one of an inclined surface and a multi-step surface.

According to an embodiment, the electronic barometer device further comprises a first annular sealing layer provided between the top body layer and the circumferential biasing portion to enhance a sealing effect between the top body layer and the base.

According to an embodiment, the he electronic barometer device further comprises one or more second annular sealing layers provided between the top body layer of the inflatable body and the top cover portion of the housing of the electronic barometer arrangement.

According to an embodiment, each of the first annular sealing layer and the one or more second annular sealing layers comprises a woven layer and one or more surface layers at each of two sides of the woven layer which is made of a fiber material, wherein each surface layer is made of one of PVC and TPU.

According to an embodiment, the top cover portion of the housing comprises a first step ring part, a second step ring part and a third step ring part, the first step ring part is located under the second step ring part which is located under the third step ring part, a diameter of the first step ring part is smaller than a diameter of the second step ring part, the diameter of the second step ring part is smaller than a diameter of the third step ring part, when the electronic barometer arrangement is assembled with the base, the first annular sing layer, the top body layer and the one or more second annular sealing layers are stacked between the circumferential biasing portion of the base and the first step ring part of the top cover portion of the housing.

According to an embodiment, the circumferential biasing portion of the base comprises a top annular ridge, a first groove is formed at an inner side of the top annular ridge, a second groove is formed at an outer side of the top annular ridge, when the electronic barometer arrangement is assembled with the base, the first step ring part is extended into the inner channel of the tube body, the second step ring part is retained at the first groove, the third step ring part is retained at the second groove.

According to an embodiment, the circumferential biasing portion of the base comprises a first annular top surface at a bottom of the first groove and a second annular top surface at a bottom of the second groove, each of the first annular top surface and the second annular top surface is an inclined surface.

According to an embodiment, the circumferential biasing portion of the base further has one or more indented grooves formed in the top biasing surface.

According to an embodiment, the inflatable water sports apparatus is one of inflatable paddle board, inflatable speedboat, inflatable kayak, inflatable pontoon, inflatable seat, inflatable tent, inflatable dog ladder, inflatable floating platform, and an inflatable bed.

According to an embodiment, the barometer is one of piezoelectric element and strain gauge.

According to an embodiment, the electronic barometer arrangement comprises a display screen electrically connected to the controller and is positioned under the top cover portion of the housing, wherein the top cover portion is made of a transparent material.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
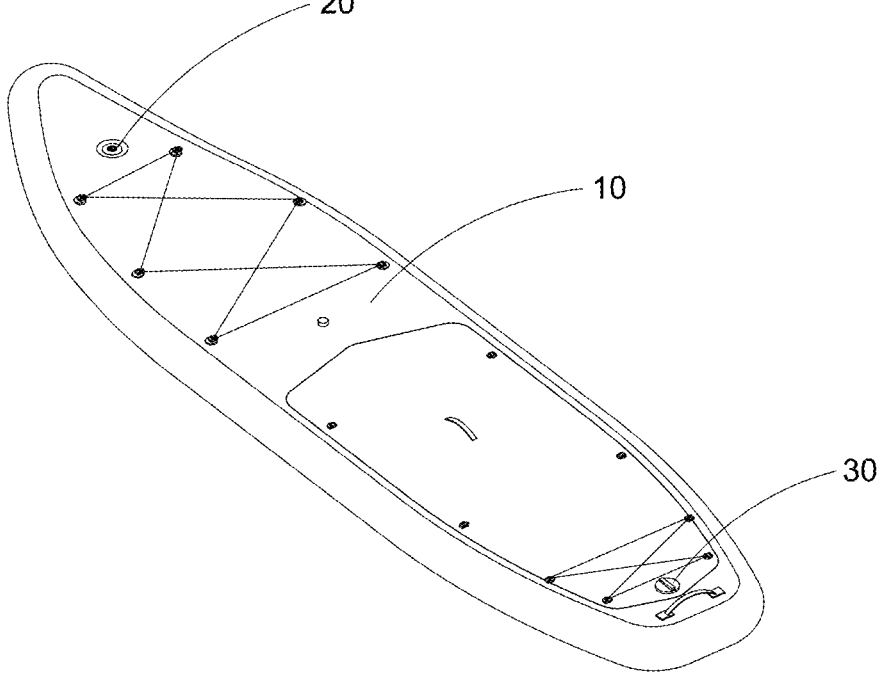
FIG. 1 is a perspective view of an inflatable water sports apparatus according to an embodiment of the present invention, wherein the inflatable water sports apparatus is illustrated as inflatable paddle board.
Figure 2:
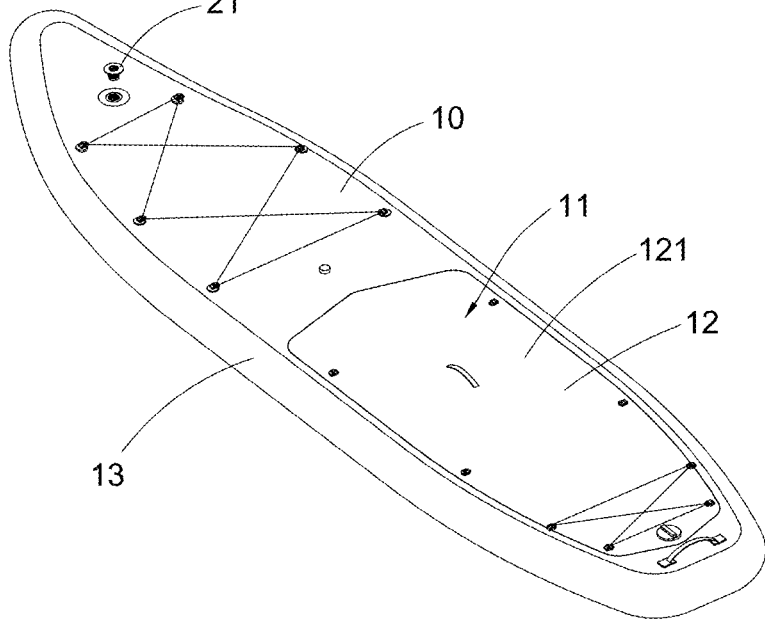
FIG. 2 is another perspective view of the inflatable paddle board according to the above embodiment of the present invention, wherein an electronic barometer arrangement is detached from an inflatable body.
Figure 3:
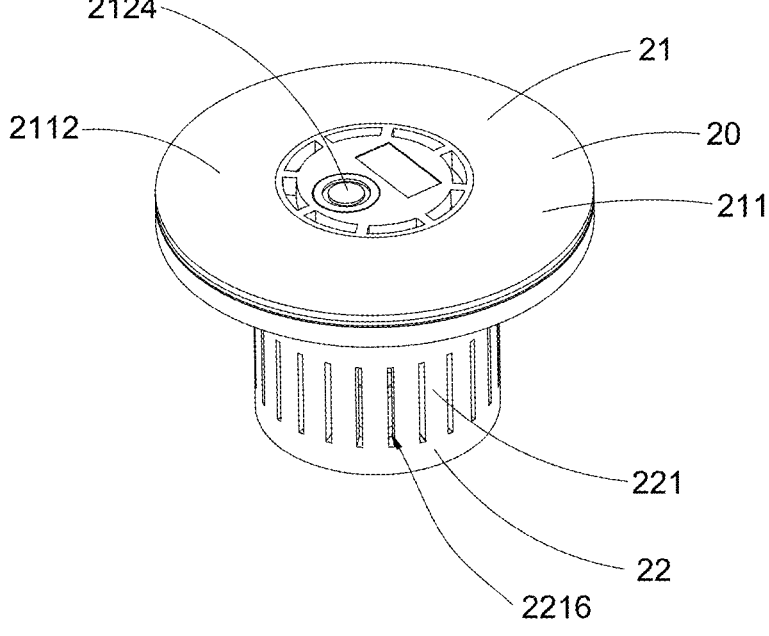
FIG. 3 is a perspective view of an electronic barometer device of the inflatable paddle board according to the above preferred embodiment of the present invention.
Figure 4:
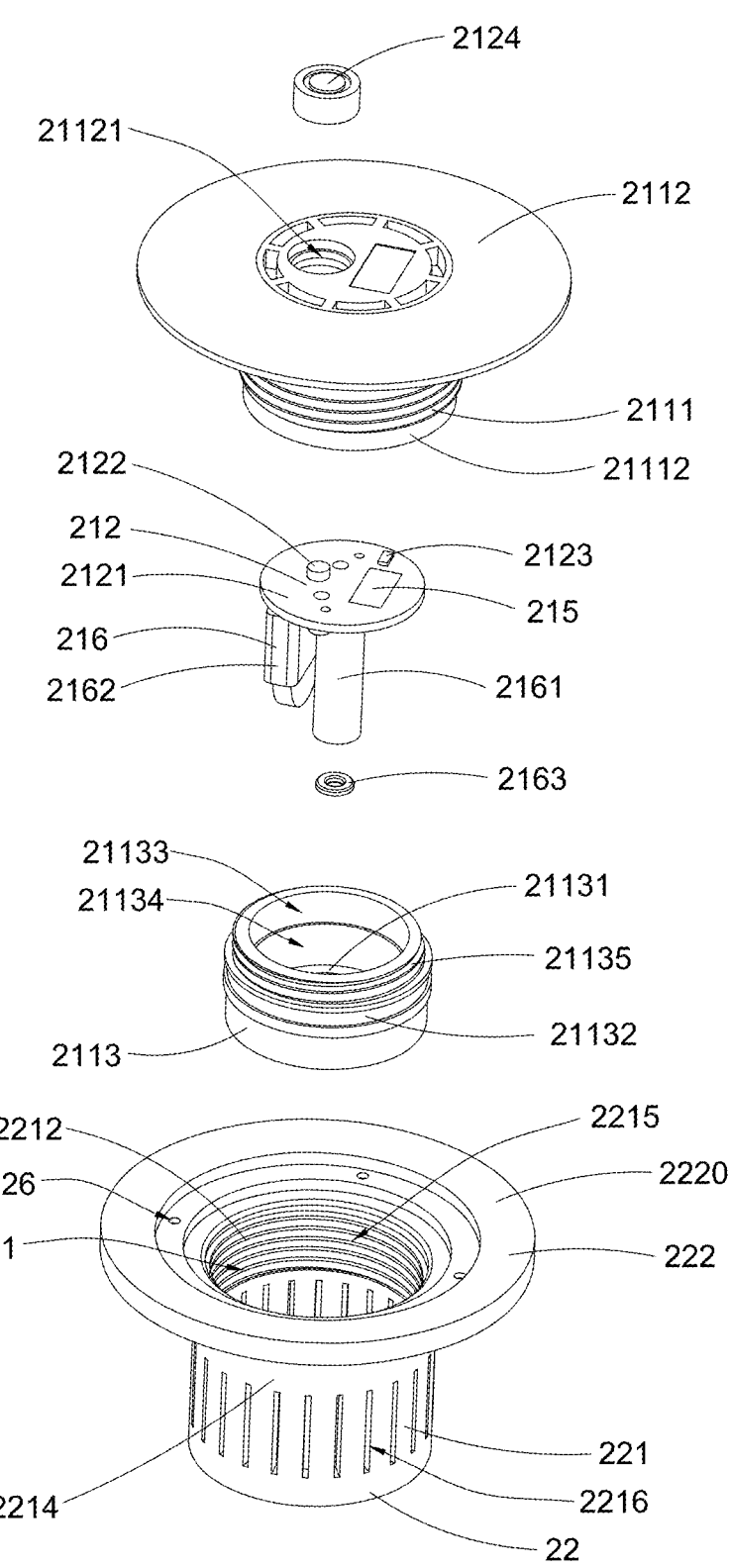
FIG. 4 is an exploded view of the electronic barometer device of the inflatable paddle board according to the above preferred embodiment of the present invention.
Figure 5:
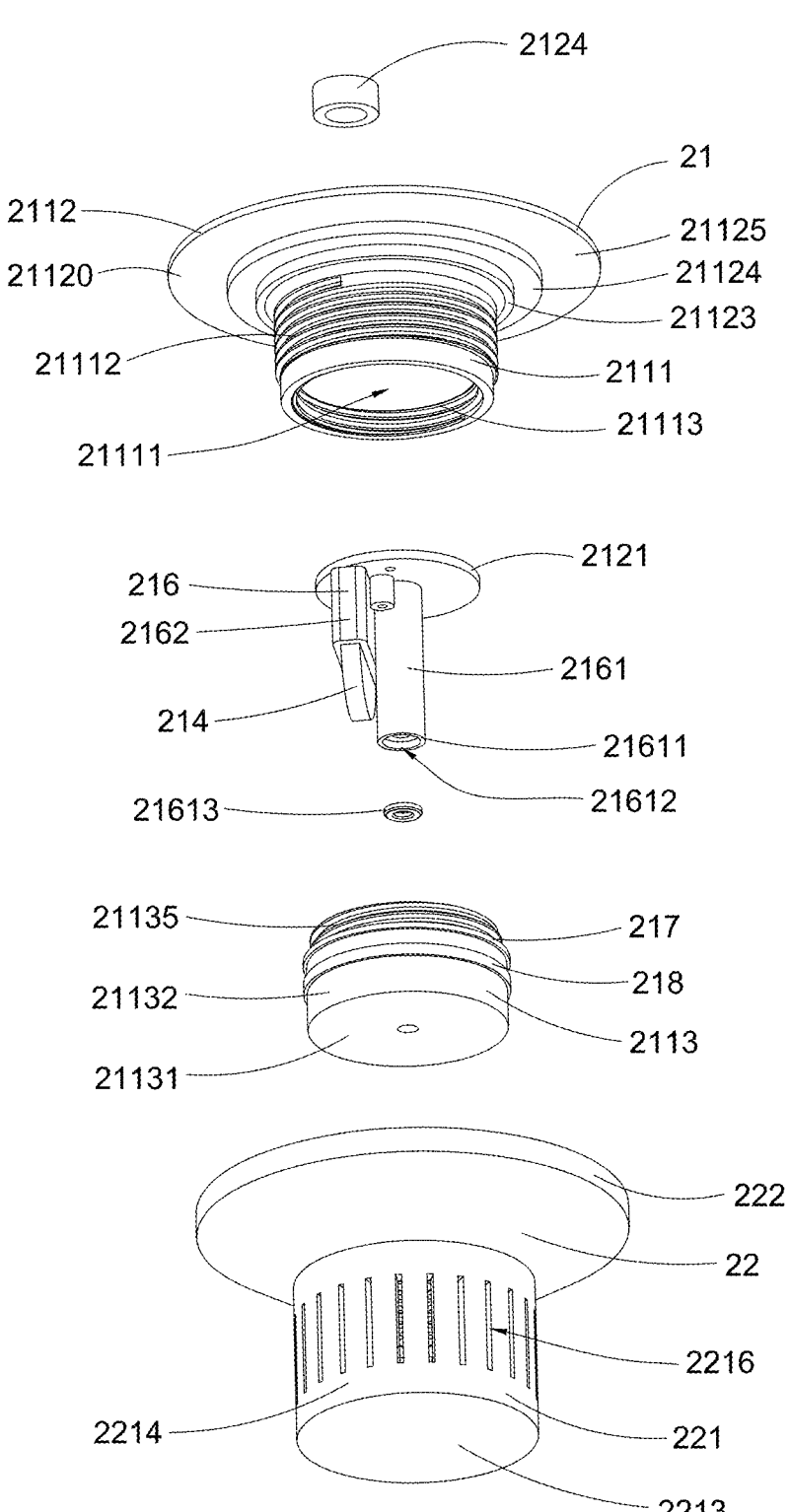
FIG. 5 is another exploded view of the electronic barometer device of the inflatable paddle board according to the above preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIG. 1 to FIG. 21B of the drawings, an inflatable water sports apparatus according to a preferred embodiment of the present invention is illustrated, the inflatable water sports apparatus comprises an inflatable body 10 having an inflation chamber 11, an electronic barometer device 20, and an inflation valve 30 for inflating the inflatable body 10. The electronic barometer device 20 is provided on the inflatable body 11 and is communicated to the inflation chamber 11, so that the internal air pressure in the inflation chamber 11 can be monitored in real time.

By integrating the electronic barometer device 20 with direct communication to the inflation chamber 11, the inflatable water sports apparatus offers monitoring of internal air pressure. Accordingly, immediate feedback during the inflation process to ensure optimal air pressure is reached. Continuous tracking of internal air pressure of the inflation chamber 11 during use of the inflatable water sports apparatus to detect gradual pressure loss, over-inflation, or sudden leakage also can be achieved.

The inflatable water sports apparatus can be but not limited to an inflatable paddle board, an inflatable speedboat, an inflatable kayak, an inflatable pontoon, an inflatable seat, an inflatable tent, an inflatable dog ladder, an inflatable floating platform, or an inflatable bed. In the following description, the inflatable water sports apparatus is embodied as an inflatable paddle board.

The inflatable body 10, which can be embodied as an inflatable paddle board body, comprises two body layers 12 which can be a top body layer 121 and a bottom body layer, a plurality of connecting threads are extended between the two body layers, a peripheral enclosing strip 13 is adhered to or thermally bonded to edges of the two body layers 12 respectively to define the inflation chamber 11 between the two body layers 12 and the peripheral enclosing strip 13. An additional decoration strip may be further attached on the peripheral enclosing strip 13.

The body layers 12 are two parallel layers of woven material connected by the plurality of connecting threads which can be polyester terylene fiber, nylon or aramid fiber. The woven material of each body layer 12 can be a fiber material such as polyester terylene fiber, nylon and aramid fiber. When the inflatable body 10 is inflated, these connecting threads hold the top and bottom surfaces together, maintaining a flat shape and allowing the inflatable body 10 to achieve high internal pressure, resulting in a firm and stable platform.

The primary material enveloping the woven material of the drop stitch core is typically polyvinyl chloride (PVC). Known for its durability and resistance to abrasions, PVC ensures that the inflatable body 10 remains airtight and resilient against environmental factors. In some cases, thermoplastic polyurethane (TPU) is used as an alternative coating, offering similar airtight properties.

The inflation valve 30 of the inflatable water sports apparatus may be configured as either a one-way valve or a two-way valve, depending on the design requirements. A one-way valve allows air to enter the inflation chamber 11 while preventing backflow, making it ideal for maintaining pressure during inflation and use. A two-way valve is arranged for both inflation and deflation, allowing for faster air release when needed.

The electronic barometer device 20 may be assembled to one of the main body layers 12 by various possible fixing methods, such as snap-fit connection, adhesive bonding, screw/bolt fastening, hot-melt fixation, or ultrasonic welding fixation.

The electronic barometer device 20 comprises an electronic barometer arrangement 21 and a base 22 for supporting the electronic barometer arrangement 21, the electronic barometer arrangement 21 is preferred to be detachably coupled to the base 22. As shown in FIG. 3 to FIG. 6B of the drawings, the base 22 comprises a tube body 221 and a circumferential biasing portion 222 connected to the tube body 221. The electronic barometer arrangement 21 can be detachably coupled with the tube body 221 by threads. It can be understood that the electronic barometer arrangement 21 and the tube body 221 may also be detachably connected by other means, such as snap-fit connection or magnetic attraction connection.

More specifically, the electronic barometer arrangement 21 comprises a housing 211, a controller 212 disposed in the housing 211, a barometer 213 electrically connected to the controller 212, a battery 214 electrically connected to the controller 212 and a display screen 215 electrically connected to the controller 212. The housing 211 comprises an engaging tube portion 2111 and a top cover portion 2112 connected to the engaging tube portion 2111. The engaging tube portion 2111 has an inner passage 21111, the controller 212, the barometer 213, the battery 214 and the display screen 215 are disposed in the inner passage 21111 of the engaging tube portion 2111.

The engaging tube portion 2111 further comprises external threads 21112, the tube body 221 of the base 22 has an inner channel 2211 and internal threads 2212 extended into the inner channel 2211. The internal threads 2212 of the tube body 221 of the base 22 can be mated and engaged with the external threads 21112 of the engaging tube portion 2111 of the housing 211, so as to detachably couple the electronic barometer arrangement 21 with the base 22.

The threaded engagement between the barometer housing 211 and the base 22 allows the electronic barometer arrangement 21 to be easily installed or removed by the user without special tools. If the barometer 213 malfunctions or the battery 214 fails, the user can replace only the electronic barometer arrangement 21 rather than the entire apparatus. The screw-thread interface also ensures a tight and stable mechanical connection, minimizing the risk of loosening due to vibration, water splashes, or physical handling, and ensuring that the electronic barometer arrangement 21 remains properly aligned and seated, maintaining airtightness between the electronic barometer arrangement 21 and the inflation chamber 11.

The top cover portion 2112 of the housing 21 protects the sensitive internal components including the controller 212, the barometer 213, the battery 214, and the display screen 215 from environmental exposure, including moisture, UV radiation, and impact.

The controller 212 comprises a control circuit board 2121 and a switch 2122 electrically connected to the control circuit board 2121. The top cover portion 2112 of the housing 21 has a mounting hole 21121, a resilient button 2124 can be disposed into the mounting hole 21121 and aligned with the switch 2122, so that the resilient button 2124 is pressed by the user to operate the switch 2122. Alternatively, the switch 2122 may be other switch such as a capacitive touch control button, so as to allow the user to operate the electronic barometer arrangement 21 through touch-sensitive input, thereby eliminating the need for mechanical actuation and enhancing durability.

The controller 212 further comprises a warning element 2123 electrically connected to the control circuit board 2121. The warning element 2123 can be a loudspeaker or a lighting illumination element to provide the warning information to the user. Alternatively, the display screen 215 is integrated with a warning interface to function as the warning element 2123.

The monitoring feature allows the inflatable water sports apparatus to trigger early warnings if abnormal pressure changes are detected. The electronic barometer device 20 can indicate slow leakage or puncture, allowing the user to respond before a complete deflation event occurs. When the inflatable water sports device is filled with air to a specified pressure. Air, as a gas, expands when exposed to heat. Since the volume of the inflation chamber 11 is relatively fixed once the inflatable body 10 is fully inflated, any significant increase in temperature leads to an increase in pressure. This sudden pressure increase can exceed the safety margin of the seams, valves, or material. Seams may burst, valves may fail, or bonding layers may delaminate under excessive internal pressure. A sudden blowout while the inflatable water sports device is in use can lead to user injury or accidents such as capsizing or falling into water unexpectedly. The high-pressure warning feature enabled by the electronic barometer device 20 enhances safety and durability of the inflatable water sports apparatus.

The top cover portion 2112 of the housing 21 further has an inner groove 21122 communicated to the inner passage 21111 of the engaging tube portion 2111, the display screen 215 is disposed in the inner groove 21122. A portion of the top cover portion 2112 of the housing 21 corresponding to the display screen 215 can be made of transparent material, so as to allow the pressure information displayed on the display screen 215 can be viewed from outside. In this embodiment, the entire top cover portion 2112 of the housing 21, or even the entire housing 21, can be made of transparent plastic material.

The battery 214 can be but not limited to a button cell, a lithium-ion battery, a rechargeable lithium-polymer battery, depending on design requirements. For compact and low-power applications, a button cell offers simplicity, low cost, and long standby life. For enhanced functionality, such as frequent pressure updates, display backlighting, or wireless communication, a rechargeable lithium battery is preferred, providing higher capacity and the option of USB or magnetic charging. The battery 214 is electrically connected to the controller 212 and enclosed within the housing 211, ensuring a stable power supply for monitoring while maintaining a sealed, water-resistant structure suitable for outdoor and marine environments.

Alternatively, a solar cell is integrated into the battery 214, serving as an environmentally friendly and maintenance-free power source. The solar cell converts ambient sunlight into electrical energy to charge the battery 214 or directly power the control circuit board 212 and associated components. This design ensures continuous operation without the need for frequent battery replacement or manual charging, making it especially suitable for outdoor water sports applications where sunlight is readily available.

The barometer 213 of the electronic barometer arrangement 21 employs either a piezoelectric element or a strain gauge as the primary sensor. These components are capable of converting physical pressure exerted by the air within the inflation chamber 11 into electrical signals that can be interpreted by the control electronics.

A piezoelectric sensor operates based on the piezoelectric effect, where a specific crystalline material or ceramic generates an electrical charge when deformed under pressure. This charge output is directly proportional to the applied pressure, allowing accurate measurement of dynamic or rapidly changing pressures.

Alternatively, a strain gauge relies on the principle that the electrical resistance of a material changes when it is stretched or compressed. When pressure is applied, the sensor's shape subtly deforms, altering its resistance. By measuring the change in resistance, the system can deduce the amount of pressure being applied to the sensor surface.

The electrical signals produced by either sensor type are typically very weak (millivolt level) and therefore require amplification. An amplifier circuit, integrated into the controller 212, boosts the signal strength. The controller 212, which may incorporate a microprocessor or operational amplifier, further processes these signals and calculates the precise internal air pressure. The result is displayed to the user via the display screen 215, which may show the pressure digitally (e.g., PSI or Bar) or in a graphical format (e.g., a gauge or bar graph).

Both piezoelectric and strain gauge sensors offer high responsiveness to pressure changes, allowing monitoring with fine resolution. This enables the system to detect subtle fluctuations that may indicate early-stage leakage, slow pressure loss, or thermal expansion due to environmental factors.

The inner passage 21111 of the engaging tube portion 2111 of the housing 211 can be configured to be communicated to the inner channel 2211 of the tube body 221 of the base 22 which is communicated to the inflation chamber 11 of the inflatable body 10, so as to allow the barometer 213 of the electronic barometer arrangement 21 detect the air pressure in the inflation chamber 11.

In this embodiment, the tube body 221 of the base 22 comprises an end wall 2213 and an enclosing wall 2214 extended from the end wall 2213 to define the inner channel 2211 with an opening 2215, one or more holes 2216 can be formed in at least one of the end wall 2213 and the enclosing wall 2214. As shown in FIGS. 3 to 6A of the drawings, the holes are a plurality of slots which are formed in the enclosing wall 2214 extending along a length of the enclosing wall 2214 under the internal threads 2212, so as to communicate the inner channel 2211 with the inflation chamber 11 of the inflatable body 10.

Alternatively, as shown in FIGS. 13 to 16 of the drawings, the base 22 comprises an mesh cover 223 disposed in the inner channel 2211 and is attached to the end wall 2213 of the tube body 221. The holes 2216 with a larger size can be formed at the end wall 2213 and the enclosing wall 2214.

Figure 15:
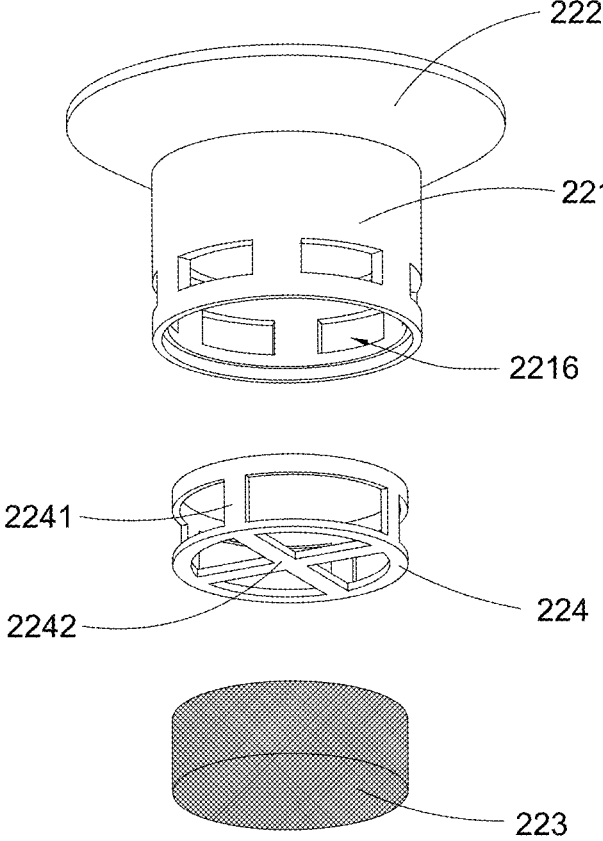
FIG. 15 is an exploded view of a base of the electronic barometer device of the inflatable paddle board according to the third alternative mode of the above preferred embodiment of the present invention.
Figure 16:
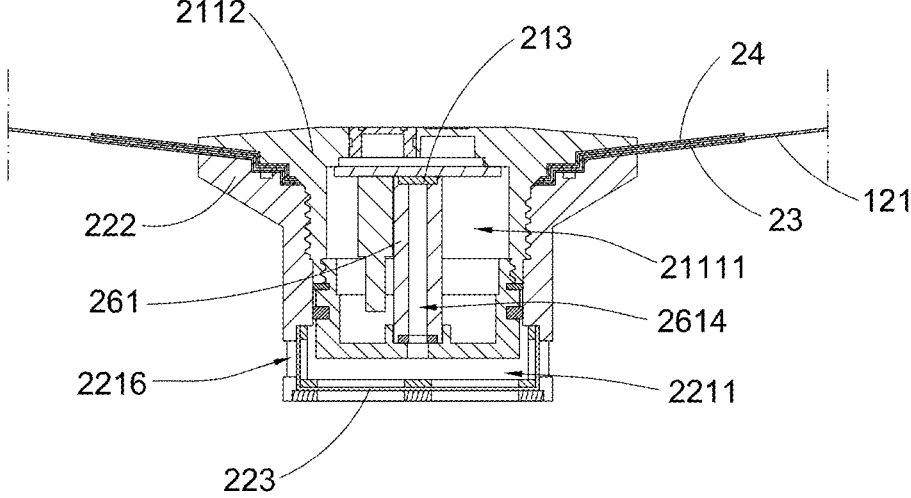
FIG. 16 is a schematic view illustrating the electronic barometer device being installed with the inflatable body of the inflatable paddle board according to the third alternative mode of the above preferred embodiment of the present invention.

The mesh cover 223, being interposed between these larger holes 2216 and the barometer 213, acts as a filtering and shielding element without obstructing airflow communication between the inflation chamber 11 and the barometer 213. The mesh cover 223 acts as a physical barrier that prevents foreign particles from entering the inner channel 2211 and reaching the barometer 213. As shown in FIG. 15, the base further comprises a mounting frame 224 which comprises an inner support frame member 2241 and an end frame member 2242, the mesh cover 223 is assembled between the inner support frame member 2241 and the end frame member 2242 which are mounted into the tube body 221.

The housing 211 further comprises a bottom cover portion 2113 which comprises a bottom end wall 21131 and a circumferential wall 21132 extended from the bottom end wall 21131 to define an inner chamber 21133 having a top opening 21134. Outer threads 21135 are formed at an outer side of the circumferential wall 21132, the engaging tube portion 2111 comprises inner threads 21113 extended into the inner passage 21111, so as to be mated and engaged with the outer threads 21135 of the bottom cover portion 2113, so as to detachably couple the engaging tube portion 2111 with the bottom cover portion 2113 to form the inner passage 21111 for housing the controller 212, the barometer 213, the battery 214 and the display screen 215.

The bottom cover portion 2113 has at least one communicating hole 21136 formed at the bottom end wall 21131, so as to communicate the inner passage 21111 to the inner channel 2211 of the tube body 221 of the base 22, so as to allow the barometer 213 disposed in the inner passage 21111 to detect the air pressure in the inflation chamber 11 of the inflatable body 10.

Figure 6A:
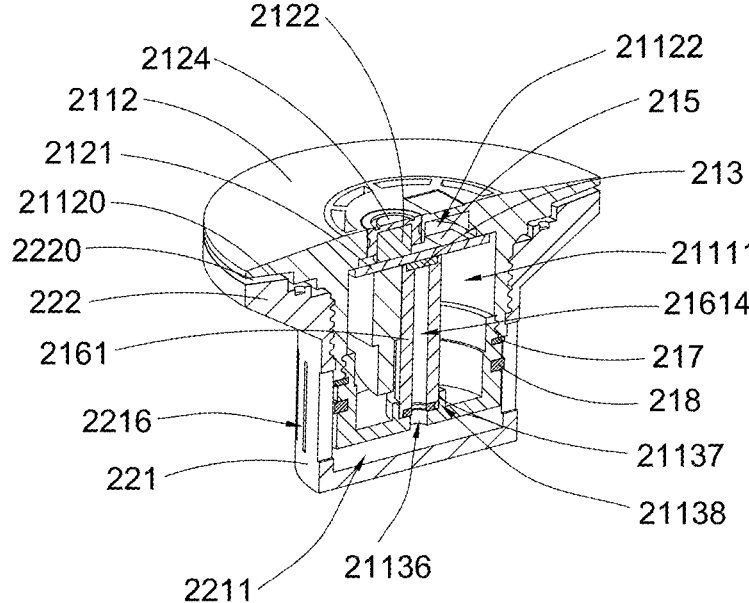
FIG. 6A is a schematic view of the electronic barometer device of the inflatable paddle board according to the above preferred embodiment of the present invention.

As shown in FIG. 6A, the bottom cover portion 2113 further comprises a ring wall 21137 extended from the bottom end wall 21131 into the inner passage 21111, the communicating hole 21136 is formed at an inner side of the ring wall 21137. A shelter groove 21138 is formed in the ring wall 21137. The electronic barometer arrangement 21 further comprises a support frame 216 which comprises a sealing tube 2161 attached to the control circuit board 2121 for housing the barometer 213 and a battery housing 2162 for retaining the battery 214. The sealing tube 2161 comprises a bottom end portion 21611 which is disposed in the shelter groove 21138 at the inner side of the ring wall 21137. The bottom end portion 21611 is further formed with an installation groove 21612 which is disposed with a sealing ring 21613. The sealing tube 2161 has a channel 21614 for directing air to the barometer 213.

The housing 21 further comprises an upper annular sealing member 217 wound around an upper portion of the circumferential wall 21132 and a lower annular sealing member 218 wound around a lower portion of the circumferential wall 21132. When the bottom cover portion 2113 is installed with the engaging tube portion 2111, the upper annular sealing member 217 is engaged with the inner threads 21113 and is retained between the circumferential wall 21132 of the bottom cover portion 2113 and the engaging tube portion 2111. When the electronic barometer arrangement 21 is mounted to the base 22, the lower annular sealing member 218 is engaged with the internal threads 2212 of the tube body 221 and is retained between the circumferential wall 21132 of the bottom cover portion 2113 and the tube body 221.

One of the body layer 12, preferred the top body layer 121, is formed with an installation opening 122, the base 22 of the electronic barometer device 20 is disposed between the two body layers 12 before the peripheral enclosing strip 13 is bonded to edges of the two body layers 12 to form the inflation chamber 11. The base 22 is placed in the inflation chamber 11 at a position corresponding to the installation opening 122. An outer diameter of the circumferential biasing portion 222 is larger than a diameter of the installation opening 122, so that the base 22 will be retained in the inflation chamber 11 when the peripheral enclosing strip 13 is bonded to the two body layers 12.

Figure 6B:
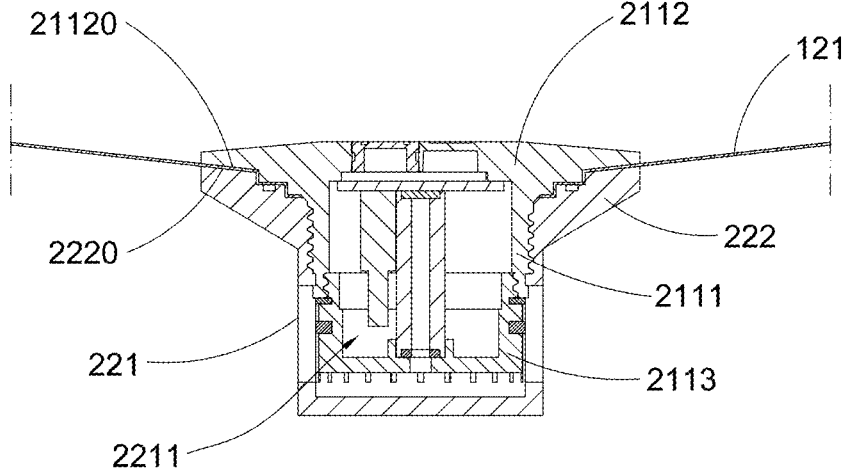
FIG. 6B is a schematic view illustrating the electronic barometer device being installed with the inflatable body of the inflatable paddle board according to the above preferred embodiment of the present invention.
Figure 7:
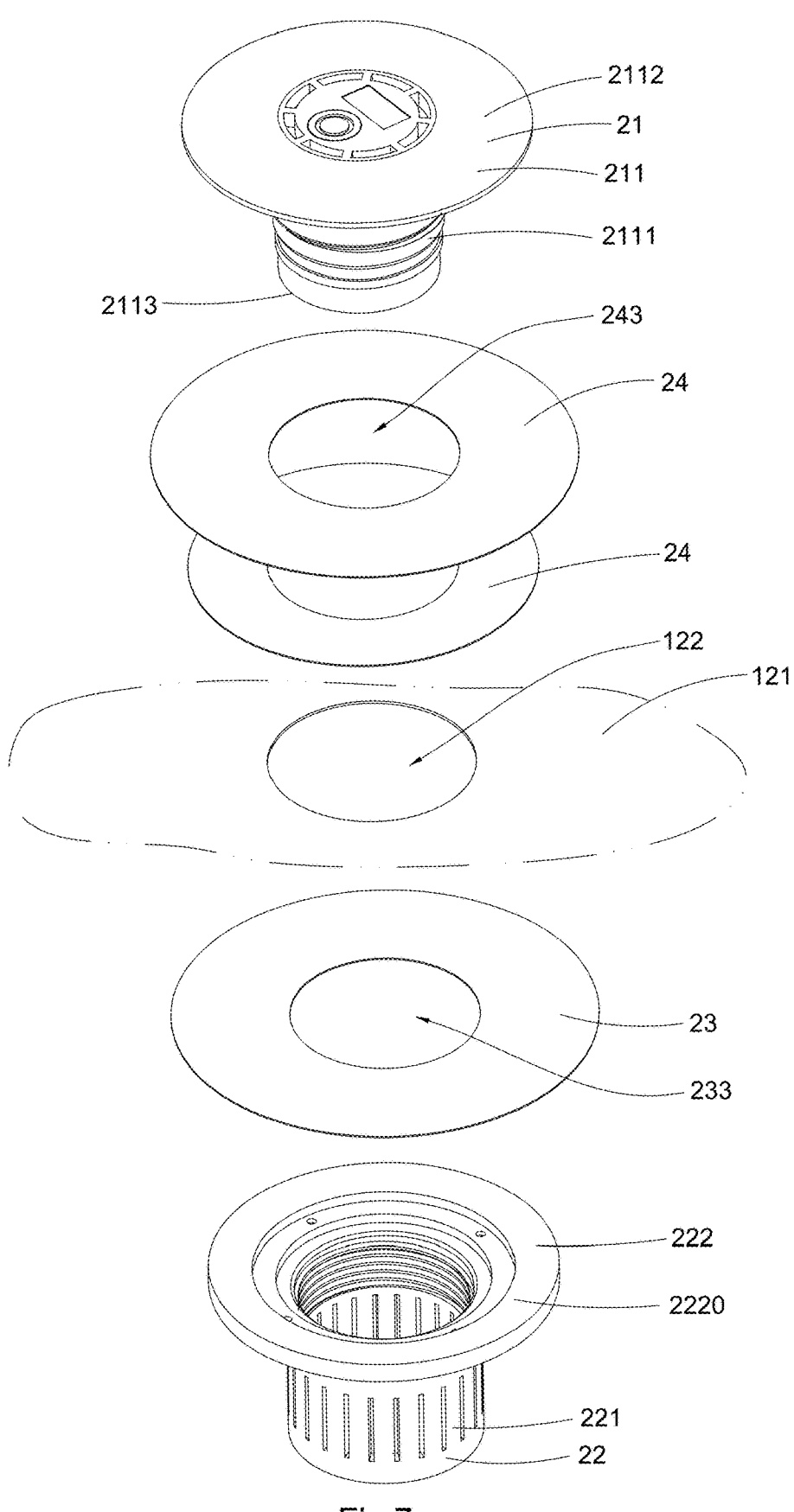
FIG. 7 is an exploded view illustrating the electronic barometer device being installed with the inflatable body of the inflatable paddle board according to a first alternative mode of the above preferred embodiment of the present invention.
Figure 8:
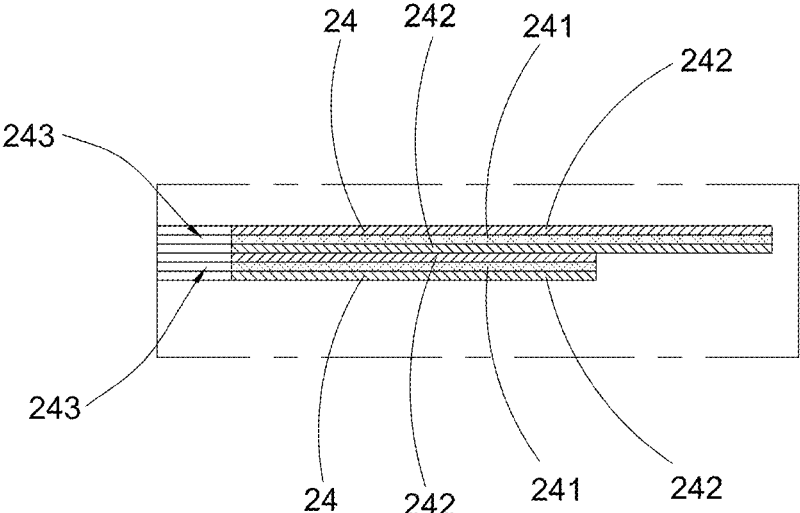
FIG. 8 is a schematic view illustrating two second annular sealing layers of the inflatable paddle board according to the first alternative mode of the above preferred embodiment of the present invention.
Figure 9:
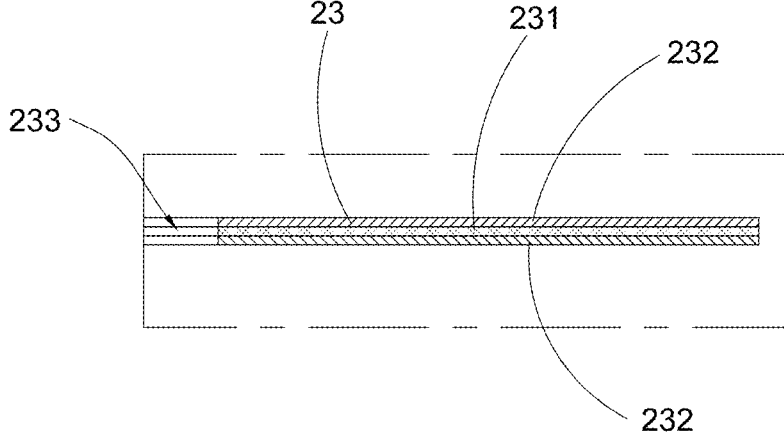
FIG. 9 is a schematic view illustrating a first annular sealing layer of the inflatable paddle board according to the first alternative mode of the above preferred embodiment of the present invention.
Figure 17:
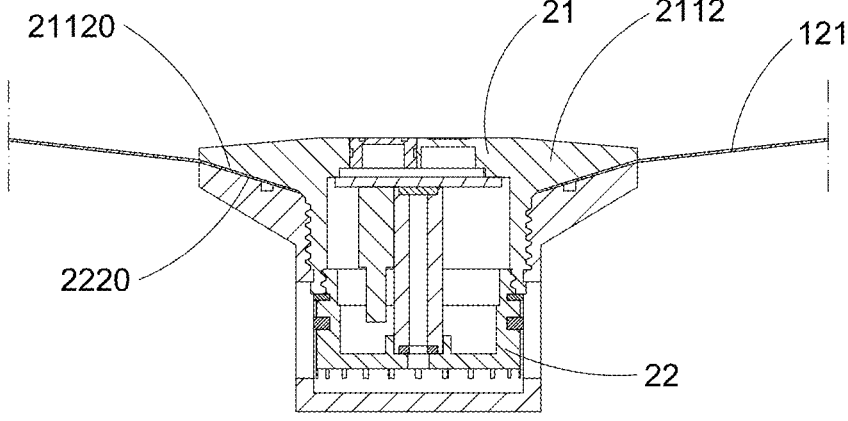
FIG. 17 is a schematic view illustrating the electronic barometer device being installed with the inflatable body of the inflatable paddle board according to a fourth alternative mode of the above preferred embodiment of the present invention.
Figure 18:
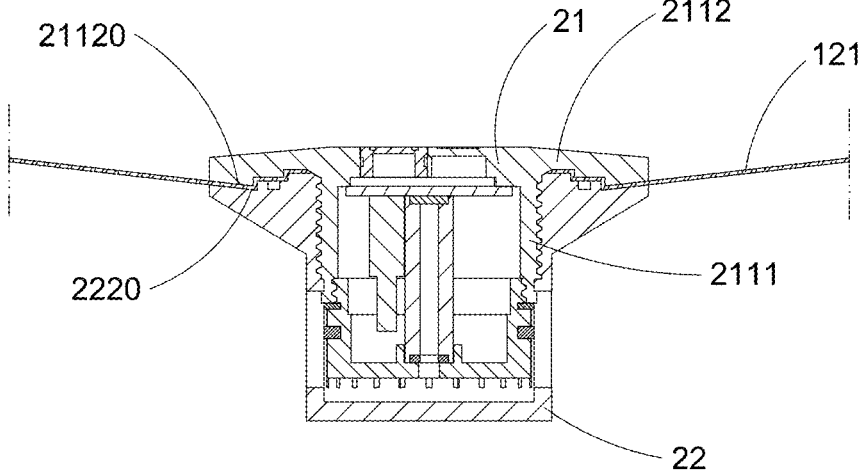
FIG. 18 is a schematic view illustrating the electronic barometer device being installed with the inflatable body of the inflatable paddle board according to a fifth alternative mode of the above preferred embodiment of the present invention.

As shown in FIG. 6B, the top cover portion 2112 comprises a bottom biasing surface 21120, the circumferential biasing portion 222 of the base 22 comprises a top biasing surface 2220, the top body layer 121 can be retained between the bottom biasing surface 21120 of the top cover portion 2112 and the top biasing surface 2220 of the circumferential biasing portion 222 of the base 22, so as to mount the electronic barometer device 20 to the inflatable body 10 of the inflatable water sports apparatus. As shown in FIG. 6B and FIG. 18, the bottom biasing surface 21120 and the top biasing surface 2220 comprise mating step surfaces. As shown in FIG. 17, the bottom biasing surface 21120 and the top biasing surface 2220 are inclined surfaces.

As shown in FIGS. 7 to 11B of the drawings, a first alternative electronic barometer device 20 of the inflatable water sports apparatus further comprises a first annular sealing layer 23, when the base 22 is disposed in the inflation chamber 11, the first annular sealing layer 23 can be placed between the top body layer 121 and the circumferential biasing portion 222, so as to enhance the sealing effect between the top body layer 121 and the base 22.

The first annular sealing layer 23 comprise a first woven layer 231 and one or more first surface layers 232 at each of two sides of the first woven layer 231 which can be a fiber material such as polyester terylene fiber, nylon and aramid fiber. Each first surface layer 232 can be made of PVC or TPU. These surface layers enhance the airtightness, elasticity, and chemical resistance of the sealing structure while also allowing for effective bonding to the top body layer 121 and the circumferential biasing portion 222. A first central hole 233 is formed in a center of the first annular sealing layer 23.

Preferably, each first surface layer 232 is a PVC layer. Liquid PVC is applied to the surface of the woven fabric to form a the PVC protective coating that adheres closely to the woven surface, enhancing its waterproofing and abrasion resistance. More preferably, multiple layers of the first surface layers 232 are applied on the first woven layer 231. A thickness of each first annular sealing layer 23 is preferred 0.4 mm-1 mm.

The electronic barometer device 20 of the inflatable water sports apparatus further comprises one or more second annular sealing layers 24, when the electronic barometer arrangement 21 is mounted on the base 22, the second annular sealing layers 24 are provided between the top body layer 121 of the inflatable body 10 and the top cover portion 2112 of the housing 21 of the electronic barometer arrangement 21.

Each second annular sealing layer 24 comprise a second woven layer 241 and one or more second surface layers 242 at each of two sides of the second woven layer 241 which can be a fiber material such as polyester terylene fiber, nylon and aramid fiber. Each second surface layer 242 can be made of PVC or TPU. These surface layers enhance the airtightness, elasticity, and chemical resistance of the sealing structure while also allowing for effective bonding to the top body layer 121 and the top cover portion 2112 of the housing 21 of the electronic barometer arrangement 21. A second central hole 243 is formed in a center of the second annular sealing layer 24.

Preferably, each second surface layer 242 is a PVC layer. Liquid PVC is applied to the surface of the woven fabric to form a the PVC protective coating that adheres closely to the woven surface, enhancing its waterproofing and abrasion resistance. More preferably, multiple layers of the second surface layers 242 are applied on the first woven layer 231. A thickness of each second annular sealing layer 24 is preferred 0.4 mm-1 mm.

In this embodiment, two second annular sealing layers 24 are adhered with each other and then is bonded between the top cover portion 2112 of the housing 21 of the electronic barometer arrangement 21 and the top body layer 121 of the inflatable body 10. The two second annular sealing layers 24 can be embodied to have different area sizes. As an example, a top second annular sealing layer 24 has an outer diameter larger than a bottom second annular sealing layer 24, so as to form a stepped or layered sealing interface. This dual-layer sealing structure enhances the air-tightness of the assembly and improves resistance to air leakage at the interface between the barometer housing 21 and the inflatable body 10.

Figure 10A:
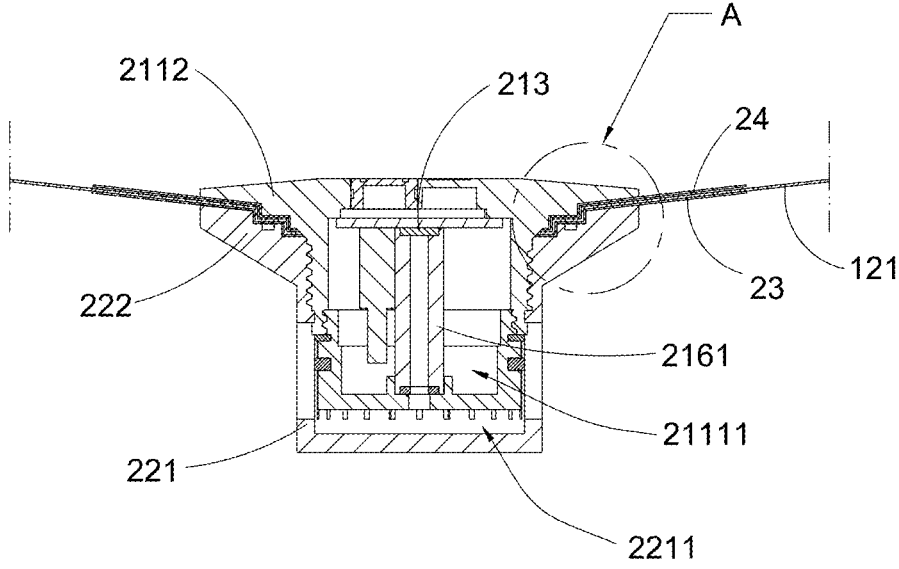
FIG. 10A is a schematic view illustrating the electronic barometer device being installed with the inflatable body of the inflatable paddle board according to the first alternative mode of the above preferred embodiment of the present invention.
Figure 10B:
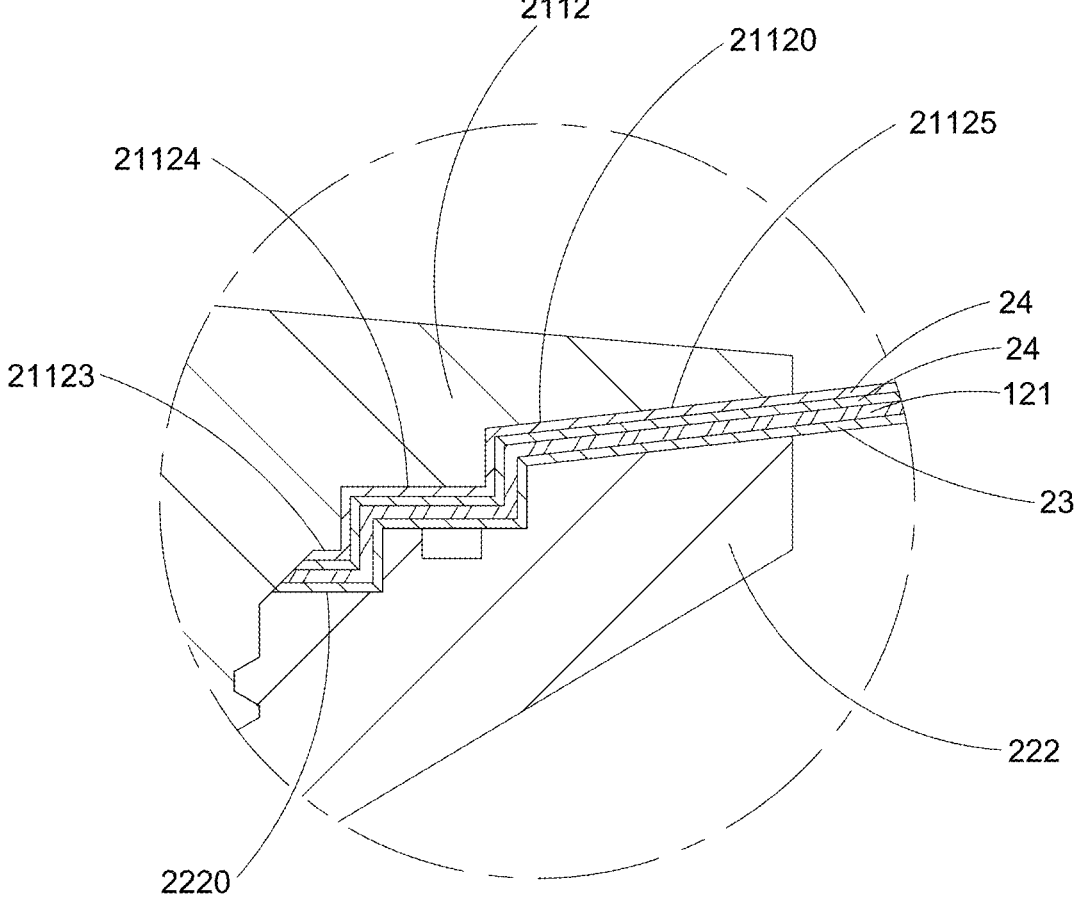
FIG. 10B is an enlarged view of an area A of FIG. 10A.
Figure 11A:
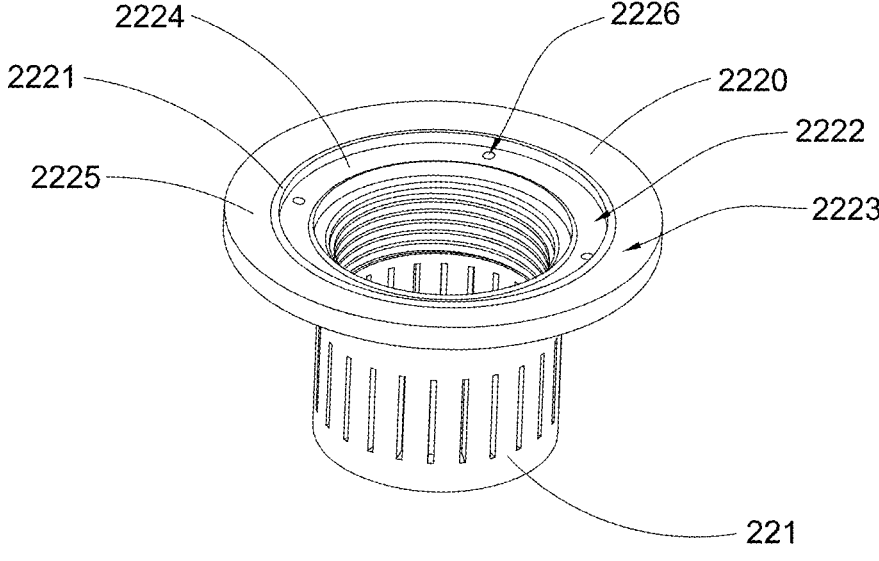
FIG. 11A is a perspective view of a base of the electronic barometer device of the inflatable paddle board according to a second alternative mode of the above preferred embodiment of the present invention.
Figure 11B:
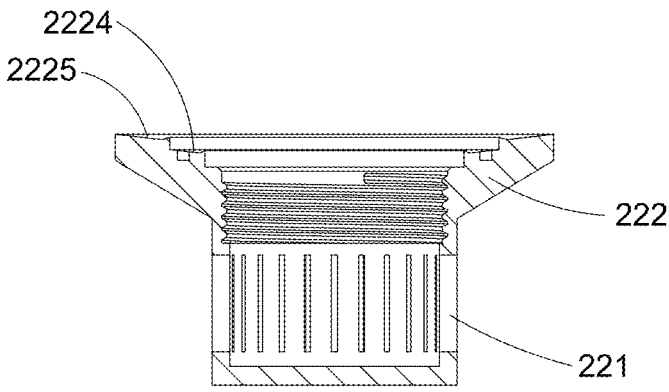
FIG. 11B is a sectional view of the base of the electronic barometer device of the inflatable paddle board according to the second alternative mode of the above preferred embodiment of the present invention.
Figure 12A:
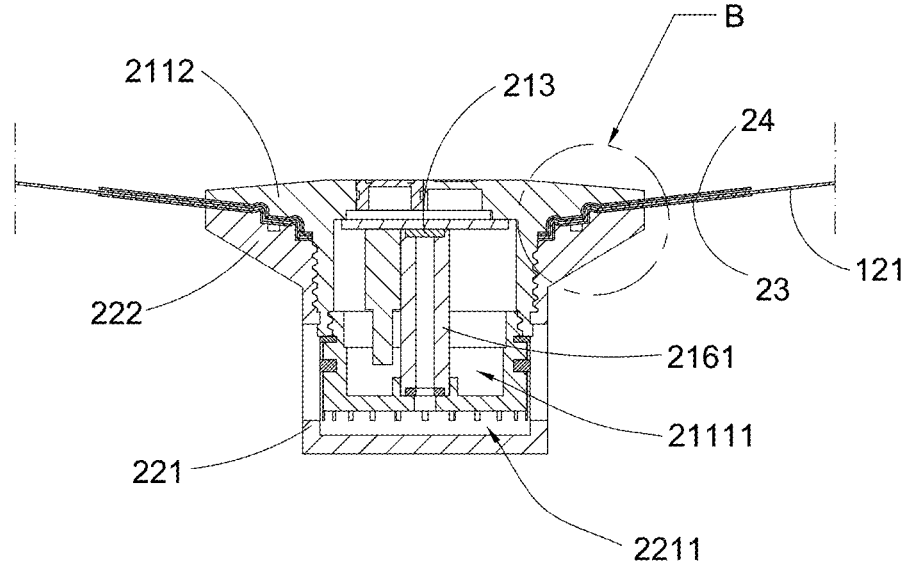
FIG. 12A is a schematic view illustrating the electronic barometer device being installed with the inflatable body of the inflatable paddle board according to the second alternative mode of the above preferred embodiment of the present invention.
Figure 12B:
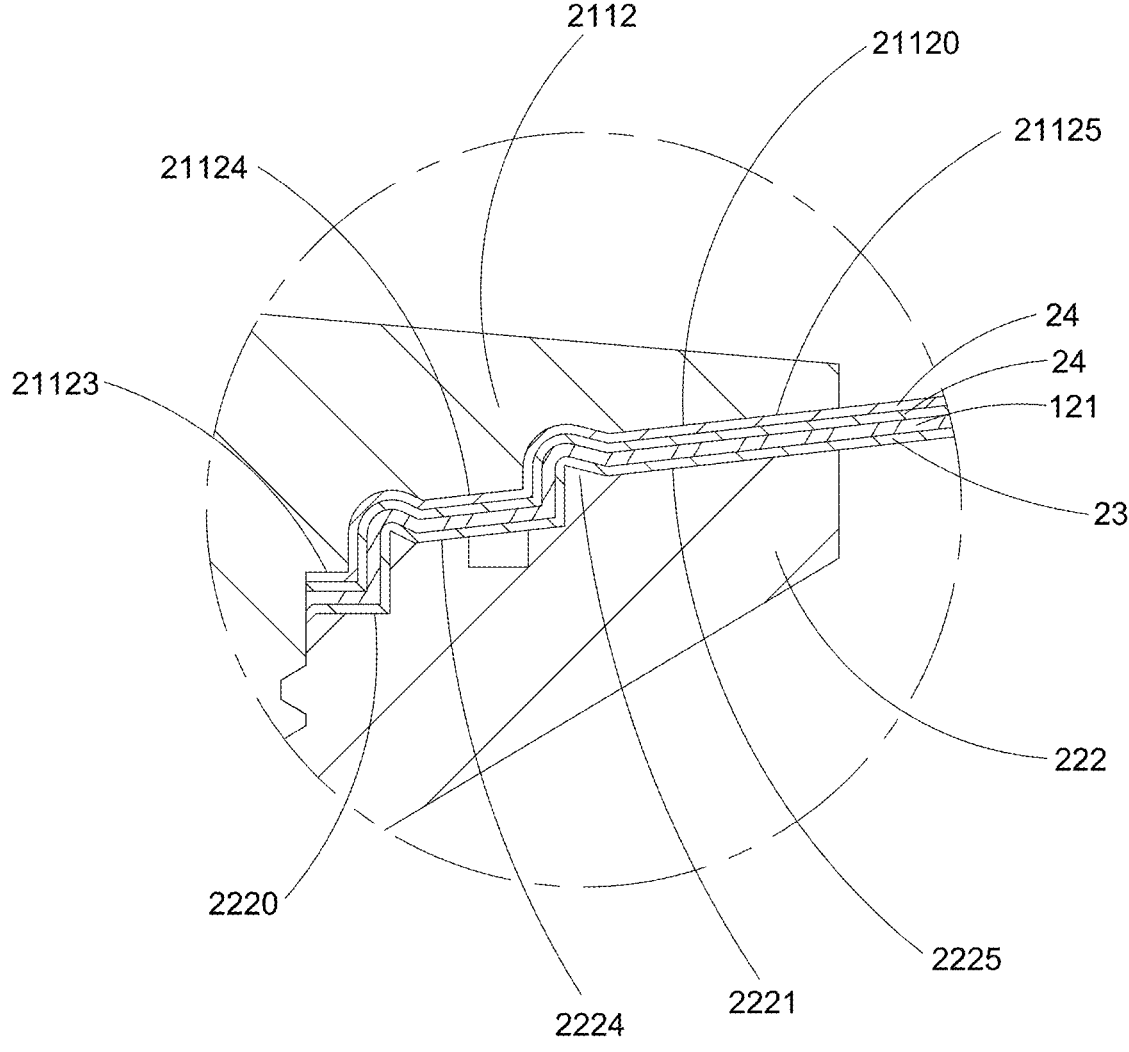
FIG. 12B is an enlarged view of an area B of FIG. 12A.
Figure 13:
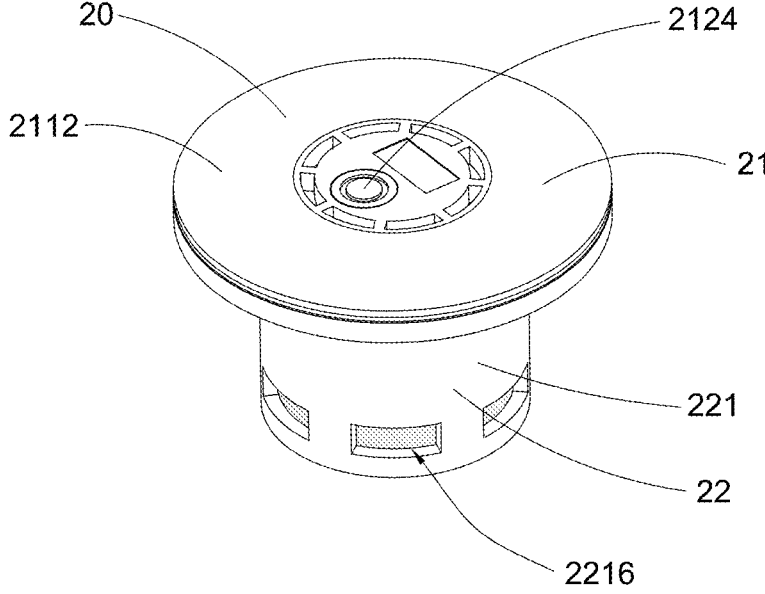
FIG. 13 is a perspective view of an electronic barometer device of the inflatable paddle board according to a third alternative mode of the above preferred embodiment of the present invention.
Figure 14:
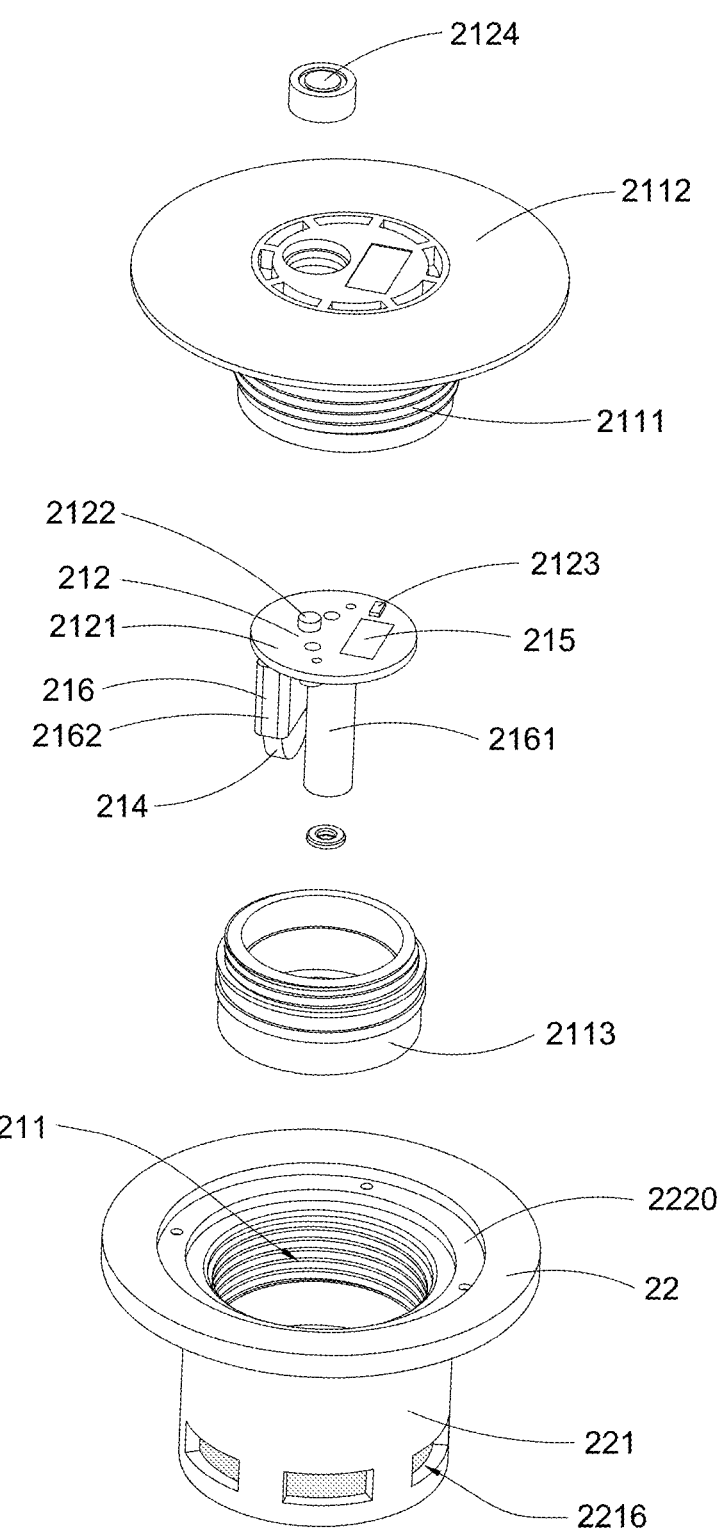
FIG. 14 is an exploded view of the electronic barometer device of the inflatable paddle board according to the third alternative mode of the above preferred embodiment of the present invention.

As shown in FIG. 10B, the top cover portion 2112 of the housing 21 of the electronic barometer arrangement 21 comprises a first step ring part 21123, a second step ring part 21124 and a third step ring part 21125. The first step ring part 21123 is located under the second step ring part 21124 which is located under the third step ring part 21125. A diameter of the first step ring part 21123 is smaller than a diameter of the second step ring part 21124, the diameter of the second step ring part 21124 is smaller than a diameter of the third step ring part 21125.

As shown in FIG. 10B of the drawings, when the electronic barometer arrangement 21 is assembled with the base 22, the first annular sealing layer 23, the top body layer 121 and the second annular sealing layers 24 are stacked between the circumferential biasing portion 222 of the base 22 and the first step ring part 21123 of the top cover portion 2112 of the housing 21.

As shown in FIGS. 11A to 12B, in a second alternative electronic barometer device 20, the circumferential biasing portion 222 of the base 22 comprises a top annular ridge 2221, a first groove 2222 is formed at an inner side of the top annular ridge 2221, a second groove 2223 is formed at an outer side of the top annular ridge 2221. When the electronic barometer arrangement 21 is assembled with the base 22, the first step ring part 21123 is extended into the inner channel 2211 of the tube body 221, the second step ring part 21124 is retained at the first groove 2222, the third step ring part 21125 is retained at the second groove 223.

The circumferential biasing portion 222 of the base 22 comprises a first annular top surface 2224 at a bottom of the first groove 2222 and a second annular top surface 2225 at a bottom of the second groove 2223. Each of the first annular top surface 2224 and the second annular top surface 2225 is preferred to be an inclined surface.

The central annular ridge and surrounding grooves create a self-centering structure, guiding the step ring parts into their proper positions during assembly. This improves assembly precision and repeatability, whether by machine or manually. The multi-level interlock is inherently resistant to loosening due to mechanical vibration, shock, or pressure cycling, improving long-term durability.

The inclined surfaces 2224 and 2225 at the bottom of each groove act as tapered seats that improve the compression interface between components, so that it is beneficial for maintaining consistent sealing pressure under dynamic pressure changes and environmental variation.

The circumferential biasing portion 222 of the base 22 further has one or more indented grooves 2226 formed in the first annular top surface 2224, so as to provide deformation space for the first annular sealing layer 23.

When the electronic barometer arrangement 21 is assembled with the base 22, the base 22, the engaging tube portion 2111 of the housing 21 are disposed in the inflation chamber 11, the top cover portion 2112 is on top of the top body layer 12. A height position of the resilient button 2124 is slightly higher than the top body layer 12, and a height position of the display screen 215 can be slightly higher than the top body layer 12, so that the resilient button 2124 is convenient and practical to operate, and the display screen 215 is easy to view. At the same time, the electronic barometer arrangement 21 is not protruded from the top body layer 12 with a larger height, so as to prevent the electronic barometer arrangement 21 from being hit and causing the connection to break, thereby increasing the service life of the electronic barometer arrangement 21 and reducing the chance of damage.

Figures 19A, 19B:
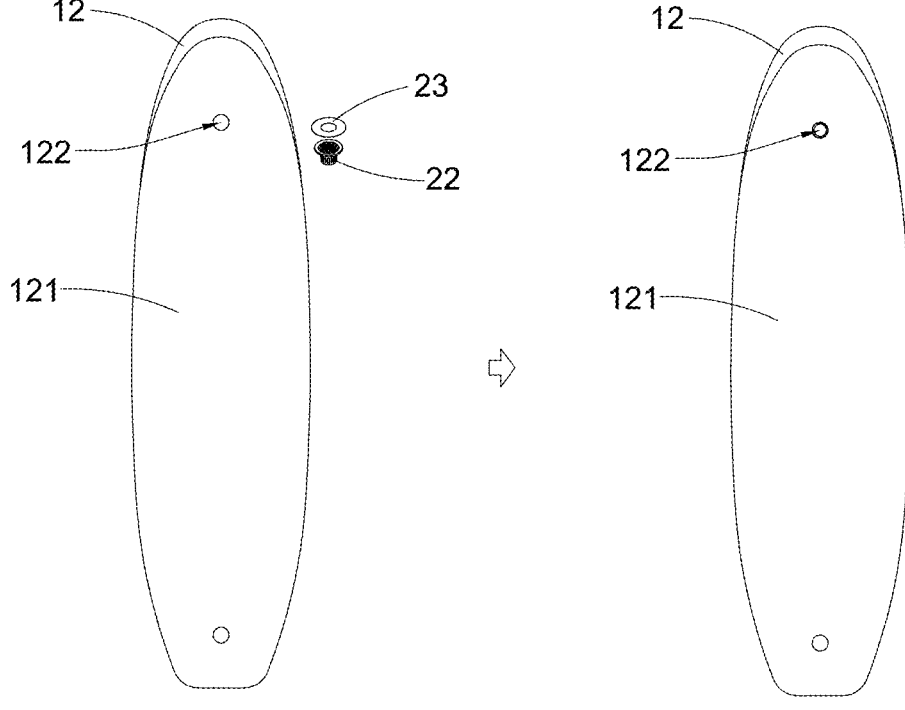
FIGS. 19A and 19B are schematic views illustrating a process of placing the base and a first annular sealing layer into two body layers of the inflatable body of the inflatable paddle board according to the above preferred embodiment of the present invention.
Figures 20A, 20B, 20C, 20D:
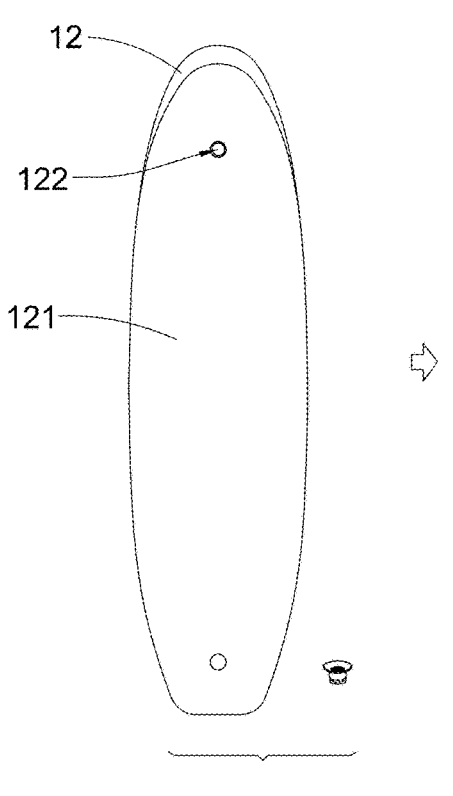
FIGS. 20A, 20B, 20C and 20D are schematic views illustrating a process of attaching a side enclosing strip to two body layers to form the inflatable body and mounting an inflation valve of the inflatable paddle board according to the above preferred embodiment of the present invention.

Referring to FIGS. 19A to 21B, an illustrative method for assembling the electric barometer device 20 and the inflation valve 30 to the inflatable body 10 is illustrated. As shown in FIGS. 19A to 19B, the two body layers 12 may have different lengths, a length of the top body layer 121 can be smaller than a length of the bottom body layer, so as to allow the inflatable body 10 to form a raised head when the inflatable body 10 is inflated. The base 23 and the first annular sealing layer 23 can be placed between the two body layers 12. In this steps, a mounting base of the inflation valve also may be placed between the two body layers 12. The base 23 may be placed between the two main body layers 12 to form the inflation chamber 11, and then the first annular sealing layer 23 may be inserted into the inflation chamber 11 through an installation opening 122 formed in the top main body layer 121 and then assembled with the base 23.

As shown in FIGS. 20A to 20D, the side enclosing strip 13 is attached to edges of the two body layers 12 to form the inflation chamber 11, the base 23 and the first annular sealing layer 23 are disposed in the inflation chamber 11. The top body layer 121 has an installation opening 122 which is aligned with the base 23 and the first annular sealing layer 23. Then a valve body of the inflation valve 30 can be mounted on the inflatable body 10.

Figures 21A, 21B:
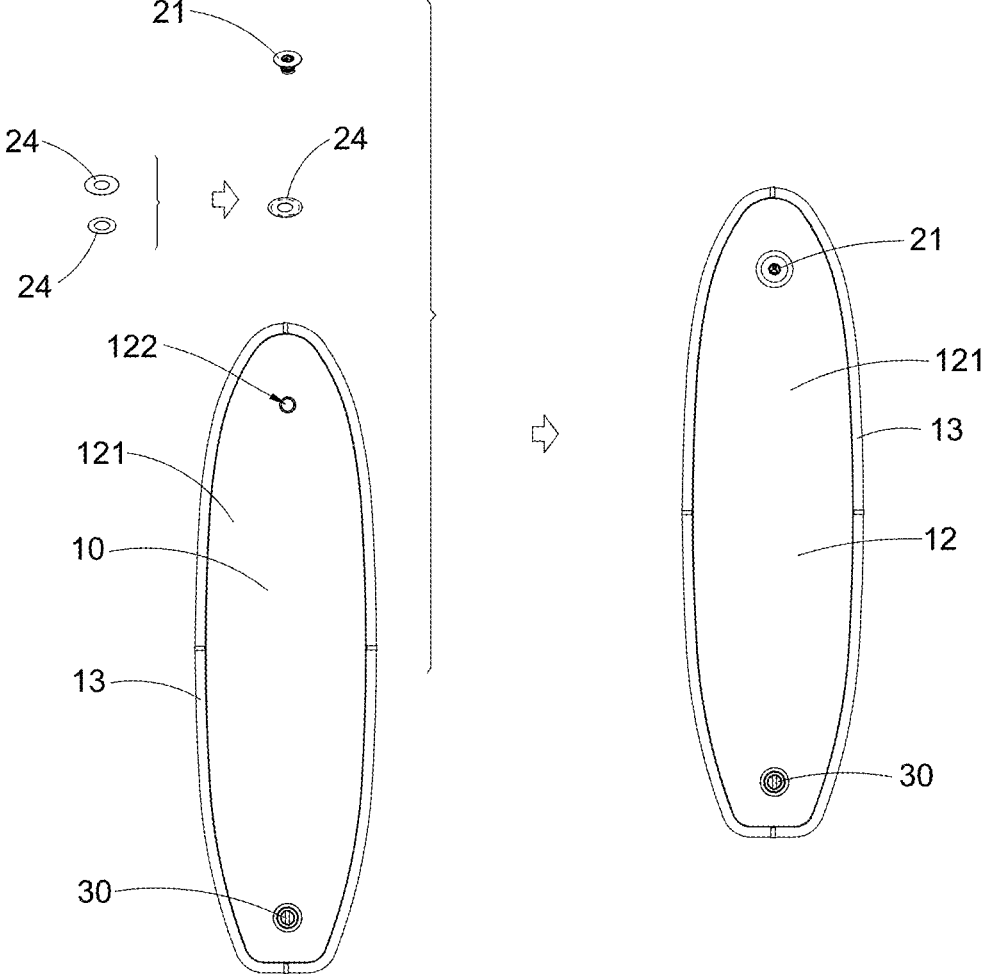
FIGS. 21A and 21B are schematic views illustrating a process of mounting the electronic barometer arrangement to the inflatable body of the inflatable paddle board according to the above preferred embodiment of the present invention.

As shown in FIGS. 21A to 21B, the one or more second annular sealing layers 24 are assembled together and then adhered to the top body layer 121 of the inflatable body 10. Then the electric barometer arrangement 21 is installed to the base 22, the top body layer 121 of the inflatable body 10 is retained between the electric barometer arrangement 21 and the base 22.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. An inflatable water sports apparatus, comprising:
an inflatable body having an inflation chamber; and
an electric barometer device installed on the inflatable body to detect an air pressure in the inflation chamber, wherein the electric barometer device comprises a base disposed in the inflation chamber and an electric barometer arrangement which comprises a housing, a controller disposed in the housing, a barometer electrically connected to the controller and communicated to the inflation chamber for detecting the air pressure in the inflation chamber, and a battery electrically connected to the controller, wherein the electric barometer arrangement is mounted on the base;
wherein the housing comprises an engaging tube portion and a top cover portion connected to the engaging tube portion, wherein the top cover portion is mounted at an outer side of the inflation chamber, wherein the engaging tube portion has an inner passage, the base has an inner channel communicated between the inner passage of the engaging tube portion and the inflation chamber, wherein the barometer is communicated to the inner channel.

2. The inflatable water sports apparatus according to claim 1, wherein the base comprises a tube body and a circumferential biasing portion connected to the tube body, the tube body has the inner channel, the electronic barometer arrangement is detachably coupled with the tube body by threads.

3. The inflatable water sports apparatus according to claim 2, wherein the engaging tube portion comprises external threads, the tube body comprises internal threads extended into the inner channel, wherein the internal threads of the tube body of the base are mated and engaged with the external threads of the engaging tube portion of the housing, so as to detachably couple the electronic barometer arrangement with the base.

4. The inflatable water sports apparatus according to claim 2, wherein one of the two body layers is retained between the circumferential biasing portion of the base and the top cover portion of the housing of the electronic barometer arrangement.

5. The inflatable water sports apparatus according to claim 2, wherein the controller comprises a control circuit board, the barometer is mounted on the control circuit board, wherein the electronic barometer arrangement further comprises a sealing tube attached to the control circuit board and disposed in the inner passage, wherein the sealing tube has a channel for housing the barometer, wherein the channel is communicated to the inner channel of the base.

6. The inflatable water sports apparatus according to claim 5, wherein the housing further comprises a bottom cover portion connected to the engaging tube portion, wherein the bottom cover portion has at least one communicating hole communicating the channel of the sealing tube to the inner channel of the base.

7. The inflatable water sports apparatus according to claim 6, wherein the bottom cover portion comprises a bottom end wall, a circumferential wall extended from the bottom end wall to define an inner chamber having a top opening for communicating with the inner passage, and a ring wall extended from the bottom end wall into the inner passage, wherein a shelter groove is formed in the ring wall, wherein the sealing tube comprises a bottom end portion which is disposed in the shelter groove at an inner side of the ring wall, the bottom end portion of the sealing tube is further formed with an installation groove which is disposed with a sealing ring.

8. The inflatable water sports apparatus according to claim 7, wherein outer threads are formed at an outer side of the circumferential wall of the bottom cover portion, the engaging tube portion comprises inner threads extended into the inner passage, so as to be mated and engaged with the outer threads of the bottom cover portion, so as to detachably couple the engaging tube portion with the bottom cover portion to form the inner passage.

9. The inflatable water sports apparatus according to claim 8, wherein the housing further comprises an upper annular sealing member wound around an upper portion of the circumferential wall and a lower annular sealing member wound around a lower portion of the circumferential wall, wherein the bottom cover portion is installed with the engaging tube portion, the upper annular sealing member is engaged with the inner threads of the engaging tube portion and is retained between the circumferential wall of the bottom cover portion and the engaging tube portion, when the electronic barometer arrangement is mounted to the base, the lower annular sealing member is engaged with the internal threads of the tube body and is retained between the circumferential wall of the bottom cover portion and the tube body.

10. The inflatable water sports apparatus according to claim 2, wherein the two body layers comprises a top body layer, wherein the top body layer has an installation opening, wherein the top body layer is retained between the circumferential biasing portion of the base and the top cover portion of the housing of the electronic barometer arrangement, wherein the engaging tube portion of the housing is extended into the inflation chamber through the installation opening.

11. The inflatable water sports apparatus according to claim 10, wherein the top cover portion of the housing of the electronic barometer arrangement comprises a bottom biasing surface, the circumferential biasing portion of the base comprises a top biasing surface, wherein the top body layer is retained between the bottom biasing surface of the top cover portion of the housing and the top biasing surface of the circumferential biasing portion of the base.

12. The inflatable water sports apparatus according to claim 11, wherein each of the bottom biasing surface of the top cover portion of the housing and the top biasing surface of the circumferential biasing portion of the base is one of an inclined surface and a multi-step surface.

13. The inflatable water sports apparatus according to claim 10, wherein the electronic barometer device further comprises a first annular sealing layer provided between the top body layer and the circumferential biasing portion to enhance a sealing effect between the top body layer and the base.

14. The inflatable water sports apparatus according to claim 13, wherein the electronic barometer device further comprises one or more second annular sealing layers provided between the top body layer of the inflatable body and the top cover portion of the housing of the electronic barometer arrangement.

15. The inflatable water sports apparatus according to claim 14, wherein each of the first annular sealing layer and the one or more second annular sealing layers comprises a woven layer and one or more surface layers at each of two sides of the woven layer which is made of a fiber material, wherein each surface layer is made of one of PVC and TPU.

16. The inflatable water sports apparatus according to claim 15, wherein the top cover portion of the housing comprises a first step ring part, a second step ring part and a third step ring part, the first step ring part is located under the second step ring part which is located under the third step ring part, a diameter of the first step ring part is smaller than a diameter of the second step ring part, the diameter of the second step ring part is smaller than a diameter of the third step ring part, when the electronic barometer arrangement is assembled with the base, the first annular sealing layer, the top body layer and the one or more second annular sealing layers are stacked between the circumferential biasing portion of the base and the first step ring part of the top cover portion of the housing.

17. The inflatable water sports apparatus according to claim 16, wherein the circumferential biasing portion of the base comprises a top annular ridge, a first groove is formed at an inner side of the top annular ridge, a second groove is formed at an outer side of the top annular ridge, when the electronic barometer arrangement is assembled with the base, the first step ring part is extended into the inner channel of the tube body, the second step ring part is retained at the first groove, the third step ring part is retained at the second groove.

18. The inflatable water sports apparatus according to claim 17, wherein the circumferential biasing portion of the base comprises a first annular top surface at a bottom of the first groove and a second annular top surface at a bottom of the second groove, each of the first annular top surface and the second annular top surface is an inclined surface.

19. The inflatable water sports apparatus according to claim 11, wherein the circumferential biasing portion of the base further has one or more indented grooves formed in the top biasing surface.

20. The inflatable water sports apparatus according to claim 2, wherein the inflatable water sports apparatus is one of inflatable paddle board, inflatable speedboat, inflatable kayak, inflatable pontoon, inflatable seat, inflatable tent, inflatable dog ladder, inflatable floating platform, and an inflatable bed.

21. The inflatable water sports apparatus according to claim 2, wherein the barometer is one of piezoelectric element and strain gauge.

22. The inflatable water sports apparatus according to claim 2, wherein the electronic barometer arrangement comprises a display screen electrically connected to the controller and is positioned under the top cover portion of the housing, wherein the top cover portion is made of a transparent material.

\* \* \* \* \*